Oct. 17, 1967  T. H. PERSON  3,347,096
METHOD AND A DEVICE FOR SEPARATING GAS
BUBBLES FROM A LIQUID FLOW
Filed Feb. 10, 1964
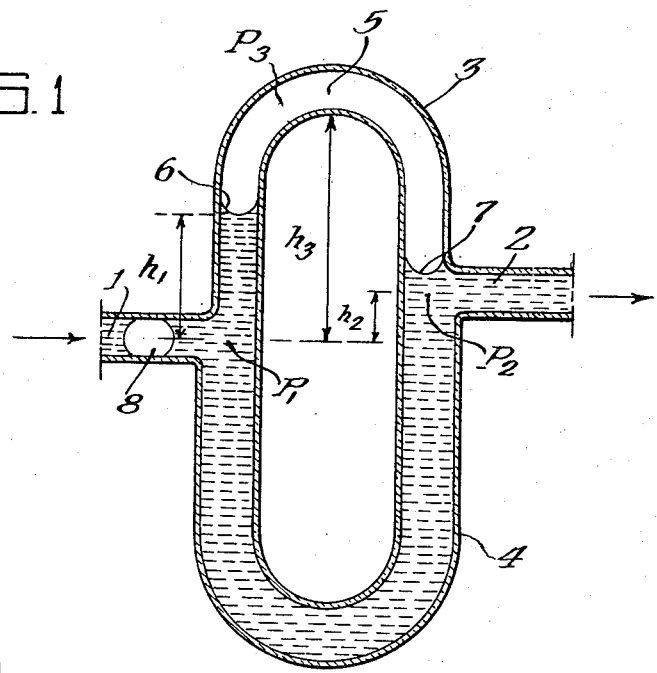
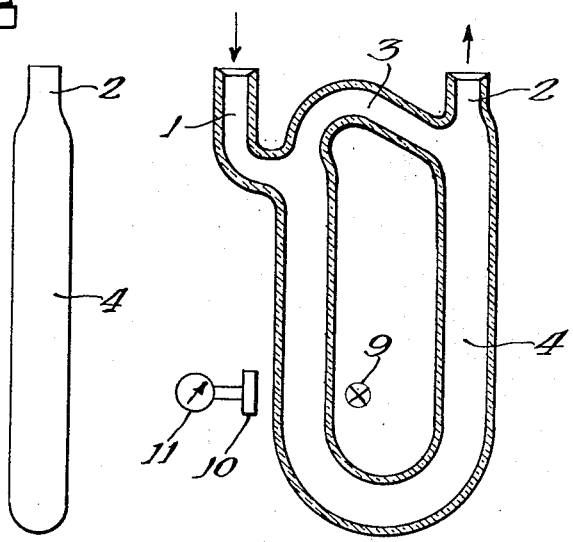
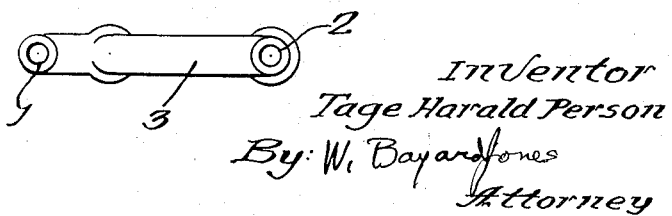
Inventor
Tage Harald Person
By: W. Bayard Jones
Attorney United States Patent Office 3,347,096
Patented Oct. 17, 1967

3,347,096
METHOD AND A DEVICE FOR SEPARATING GAS BUBBLES FROM A LIQUID FLOW
Tage Harald Person, Vallingby, Sweden, assignor to LKB-Produkter Aktiebolag, Stockholm, Sweden, a joint-stock company of Sweden
Filed Feb. 10, 1964, Ser. No. 343,712
Claims priority, application Sweden, Feb. 18, 1963, 1,774/63
6 Claims. (Cl. 73—200)

The invention is related to a method and a device for separating gas bubbles from a liquid flow containing such bubbles.

It is a frequent problem that gas bubbles contained in a liquid flow must be sepaarted from the liquid flow so that a liquid flow completely or substantially free from any gas bubbles is obtained. Normally this problem is readily solved, as in most cases it is possible to let the liquid flow pass close to a free liquid surface, which is open to the surrounding atmosphere, in such a way that the gas bubbles in the liquid flow will, due to their buoyancy in the liquid, ascend to the free liquid surface and thereby become separated from the liquid flow.

In certain applications, however, this method involves considerable difficulties and disadvantages.

In the case of devices for measuring a physical quality, as, e.g., the light absorption, the refraction index, the electric conductivity, etc., of a flowing liquid, the liquid flow is passed through a measuring cell, which is provided with means for continuously measuring the predetermined quantity of the liquid flowing through the measuring cell, and it is in this case an absolute requirement that the liquid flow passing the measuring means is completely free from any gas bubbles as these would cause such disturbances in the measurement that it would be very difficult or completely impossible to interpret the results of the measurements. It is consequently necessary to separate any gas bubbles present in the liquid flow, before this is passed through the measuring cell. Such gas bubbles may either have been unintentionally introduced in the liquid flow, when this was fed into the conduit to the measuring cell, or they may be of the type, which are intentionally inserted in the liquid flow in order to separate different liquid samples and to prevent the different samples from mixing with one another during their travel through the conduits and the measuring cell.

For this purpose one has previously connected a de-aerating device in front of the measuring cell for the separation of the gas bubbles from the liquid flow, which de-aerating device has operated in principle in the manner described above. At the point of de-aeration the liquid has, however, normally a substantial pressure partly due to the static pressure in the liquid in this point and partly due to the hydrodynamic pressure caused by the flow resistance. This flow resistance and consequently the hydrodynamic pressure can be comparatively large as often several measuring cells are connected in series and in some cases conduits having a considerable length are connected between these cells in order that chemical reactions shall have time to take place between the different measurements of the liquid. In order to provide a free liquid surface, which is open to the surrounding atmosphere and through which the gas bubbles can leave the liquid flow, it is consequently necessary to provide a stand pipe having a height corresponding to the pressure in the liquid at the point of de-aeration. This pressure is often of the magnitude of one meter water column. Further it must be considered that this pressure varies within a comparatively wide range, due to which the height of the rising pipe must be so large that a sufficient safety margin for these variations is obtained.

The de-aerating device will consequently be comparatively bulky and space consuming. Furthermore the stand pipe will contain a considerable quantity of liquid and there will take place a continuous but entirely uncontrolled interchange between the liquid in the stand pipe and the liquid in the liquid flow passing the lower end of the stand pipe in each moment. Due to this an intermixing of liquid from different parts of the liquid flow will take place, which can cause serious errors in the measurement or make the measurement impossible. When the gas bubbles are of the intentionally inserted type in order to separate different samples in the liquid flow, the known de-aerating method has the additional disadvantage that after the de-aeration no separation of the different liquid samples will exist anymore, due to which an ever increasing intermixing of the samples will arise, if the liquid after the de-aeration is passed through several measuring cells and perhaps also through delay lines connected between the measuring cells. The gas bubbles consist normally of air but can of course also consist of other gases when preferable with respect to the liquid in the liquid flow.

The above disadvantages of the known method and the known devices for the separation of gas bubbles from a liquid flow are entirely eliminated by the method according to the invention, according to which the gas bubbles are separated from the liquid flow in the known manner in that the gas bubbles are brought to ascend to a free liquid surface under the influence of their buoyancy in the liquid, but in which the liquid, which has been freed from the gas bubbles, is transferred through a closed conduit past the point of measurement to an outlet, simultaneously as the gas, which disengages itself from the liquid through the free liquid surface, is transferred through a second closed conduit from the closed space above the liquid surface to the outlet, where it is reintroduced into the liquid.

Due to the fact that in the method according to the invention the gas volume present in the closed conduit between the closed space above the liquid surface and the outlet will automatically assume substantially the same pressure as the pressure in the liquid flow and as this gas volume can be very small, it is obvious that only a very small liquid column is necessary between the free liquid surface, through which the de-aeration takes place, and the liquid flow proper, due to which the device can be given very small dimensions and the intermixing of liquid from different parts of the liquid flow will be almost negligible. As will be described more in detail in the following this liquid column can be completely eliminated in certain embodiments of the invention. As the gas volume enclosed between the free liquid surface, through which the de-aeration takes place, and the outlet can be kept very small, the movements of the liquid surface caused by pressure variations in the liquid flow will also be comparatively small, which is advantageous. Furthermore, the method according to the invention will have the effect that the gas bubbles are reintroduced in the liquid flow, when this has passed the point of measurement, i..e, substantially in the same place in the liquid flow that they have previously occupied, due to which the desired separation of different samples in the liquid flow by the gas bubbles is also provided beyond the measuring cell.

A device for separating gas bubbles from a liquid flow by the method according to the invention comprises preferably two branch conduits extending at different heights over a substantial portion of their length between an inlet and an outlet for the liquid flow, the upper branch conduit having its highest point located higher than the inlet as well as the outlet and the lower branch conduit having its lowest point located lower than the inlet as well as the outlet and having a substantial vertical portion adjacent to the inlet. When here and in the following expressions as "higher," "lower" and "upper" are used in the description of the device according to the invention and in the claims, it is assumed that the device is placed in the attitude, in which it is to be used.

In the following the invention will be described with respect to the enclosed drawing, in which FIG. 1 shows schematically the basic form of a device according to the invention, whereas FIG. 2 is a vertical sectional view through a practical embodiment of a measuring cell according to the invention for measuring the light absorption of a liquid and FIGS. 3 and 4 are a side view and a top view respectively of this measuring cell.

As shown in FIG. 1 the device according to the invention consists in principle of two branch conduits 3 and 4 connected between an inlet conduit 1 and an outlet conduit 2. The branch conduits are extending at different heights over a substantial portion of their lengths between the inlet and the outlet. Preferably, although this is not in any way an essential requirement, the two branch conduits 3 and 4 are disposed in one and the same substantially vertical plane and may preferably be mainly U-shaped, as shown in FIG. 1. The expressions "inlet" and "outlet" refer here and in the following, when not otherwise specified, to the junction between the two branch conduits 3 and 4 and the inlet conduit 1 and the junction between the two branch conduits 3 and 4 and the outlet conduit 2, respectively.

The liquid flow containing the air bubbles is fed into the device through the inlet conduit 1 and will then at first fill the lower branch conduit 4 and leave the device through the outlet conduit 2. Thus an air column 5 will be enclosed in the upper branch conduit 3. Between this air volume and the liquid two liquid surfaces will be formed, one liquid surface 6 at the inlet and another one 7 at the outlet. In the static state, i.e., when no flowing motion of the liquid through the device is present, these two liquid surfaces 6 and 7 will of course be located at the same level and on a level with the outlet. In stable operation and with a certain flowing motion of the liquid through the device, however, the liquid surface 6 at the inlet will be located at a somewhat higher level than the liquid surface 7 at the outlet, due to the hydrodynamic pressure fall from the inlet to the outlet.

It is obvious that the following relations are valid:

$$P_3 = P_1 - \rho h_1 = P_2$$
$$P_1 - P_2 = \rho h_2 + \Delta P$$

where $P_1$ is the pressure in the liquid at the inlet, $P_2$ is the pressure in the liquid at the outlet, $P_3$ the pressure in the enclosed air volume 5 in the upper branch conduit 3, $\rho$ the density of the liquid, $h_1$ the height of the liquid surface 6 above the inlet and $h_2$ the difference in height between the outlet and the inlet, as shown in FIG. 1.

From the above relations it is obtained that:

$$\rho h_1 = \Delta P + \rho h_2$$

From this relation it is evident that the liquid column between the free liquid surface 6 and the inlet will be the higher the larger the hydrodynamic pressure fall $\Delta P$ caused by the flow motion between the inlet and the outlet and the higher the outlet is located above the inlet. It is also realized that the highest point of the upper branch conduit 3 must have a height $h_3$ (FIG. 1) above the inlet, which at least corresponds to the largest appearing, total pressure difference between the inlet and the outlet, consisting partly of the static pressure difference and partly of the hydrodynamic pressure fall, as otherwise the liquid will completely fill also the upper branch conduit 3. As the hydrodynamic pressure fall in the lower branch conduit is comparatively small for the flow speeds existing in a device of the type concerned, it is realized that the liquid column between the free liquid surface 6 and the inlet will be very small, if the outlet and the inlet are disposed substantially at the same level.

When an air bubble 8 is transported by the liquid flow into the inlet, this air bubble will, due to its buoyancy in the liquid, ascend towards the free liquid surface 6 in the upper branch conduit and coalesce with the air volume 5 enclosed in the upper branch conduit. Thereby the pressure in this air volume is temporarily increased and if the pressure increase is sufficiently large to overcome the capillary force at the liquid surface 7 at the outlet pipe 2, a corresponding air bubble will be forced out into the outlet conduit 2. Thus a liquid flow completely free from any air bubbles will be obtained through the lower branch conduit 4, whereas the air bubbles will be transferred through the upper branch conduit and fed out through the outlet conduit 2 at the same rate, as they are arriving through the inlet conduit. In order to achieve this the capillary force, which must be overcome in order that an air bubble shall be discharged through the outlet conduit, should of course be as small as possible, which can be obtained by a suitable shape of the connection of the upper branch conduit 3 to the outlet conduit 2.

The means for performing a measurement upon the liquid flow can be of any conventional type for carrying out the desired measurement, as, e.g., for determining the light absorption, the refraction index, the electric conductivity, etc., of the liquid. As shown in FIG. 2 the measuring means may comprise a light source 9 disposed at one side of the lower branch conduit 4 and a photoelectric cell 10 disposed on the other side thereof. A recording or indicating measuring instrument 11 is electrically connected to the photocell 10 for determining the output voltage from the cell. The shape of the lower branch conduit can be adapted in any desired manner to the measuring means, as the shape of the lower branch conduit is of minor importance for the de-aeration process. The portion of the lower branch conduit 4 adjacent to the inlet should however preferably be substantially vertical and have such a cross section that the flow speed in this portion is not greater with respect to the viscosity and the density of the liquid than the speed at which the air bubbles can ascend towards the free liquid surface under the influence of their buoyancy.

As the air bubbles are not reinserted in the liquid flow exactly in the same places that they have previously occupied but are displaced along the liquid flow a distance corresponding to the length of the lower branch conduit, this should preferably have as small a volume as possible, in order that the smallest possible intermixing between different parts of the liquid flow shall arise. When separating different samples of a liquid flow by means of air bubbles, however, one uses normally not only a single air bubble but in most cases several air bubbles between each pair of adjacent samples, due to which the intermixing between any two adjacent samples in the liquid flow will be very small in a device according to the invention. It is consequently possible to connect several measuring cells of this type in series without the intermixing between the samples in the liquid flow becoming too large.

As already mentioned above, it is preferable, if the upper branch conduit 3 has a small volume. The cross-sectional area of this branch conduit cannot, however, be reduced too much, as in such case the capillary force in this branch conduit will be so large that some of the gas bubble will follow the liquid flow through the lower branch conduit.

Regarding the inlet and the outlet conduits these have preferably such a flow area that the air bubbles completely fill the cross-sectional area of the conduits with the exception of the liquid film surrounding the bubbles, so that no substantial liquid flow past the bubbles and thus no intermixing between different liquid samples can take place.

As seen from the relation given above the device according to the invention can be designed in such a way that the free liquid surface 6 is lower than the inlet, if the value $h_2$ is made negative, i.e., the outlet is disposed lower than the inlet. If at the same time it is seen to that the portion of the lower branch conduit 4 adjacent the inlet has such a cross-sectional area that the liquid fed into the device through the inlet does not completely fill the cross-sectional area in this portion of the lower branch conduit but is flowing along the inside of the conduit down towards the free liquid surface, a very reliable de-aeration will be achieved. This form of the invention has, however, certain disadvantages, as one wishes normally to locate the point of measurement as close to the inlet as possible along the lower branch conduit 4, as it is from this portion of the branch conduit that an old liquid sample is removed first so that a reliable and error-free measuring of the following sample can be obtained. Furthermore, it is necessary in this embodiment of the invention to ascertain, by a special design of the inlet conduit, that no portion of the air volume enclosed in the upper branch conduit can escape through the inlet conduit. This can, however, normally be readily done.

FIGS. 2, 3 and 4 show a practical form of a measuring device according to the invention for measuring the light absorption of the liquid passing through the measuring cell. The measuring cell is in principle of the type shown in FIG. 1 and described above and the different parts of the measuring cell are therefore provided with same reference numerals as corresponding parts of the basic measuring cell shown in FIG. 1. In the measuring cells according to FIGS. 2, 3 and 4 the outlet is located somewhat higher than the inlet and the upper branch conduit 3 is so connected to the outlet conduit 2 and the lower branch conduit 4 that the capillary force, which must be overcome in order to force an air bubble out from the upper branch conduit 3 into the outlet conduit 2, is small. Furthermore, the upper branch conduit 3 has a somewhat smaller cross-sectional area than the lower branch conduit 4. The lower branch conduit 4 has, e.g., an inner diameter of 4 mm., the upper branch conduit 3 an inner diameter of 2.5 mm., the outlet, i.e. the point in which the upper branch conduit 3, the lower branch conduit 4 and the outlet conduit 2 join, is disposed about 3 mm. above the inlet, i.e., the point in which the upper branch conduit 3 and the lower branch conduit 4 join the inlet conduit 1, and furthermore the center line in the upper branch conduit 3 at the highest point of this branch conduit is disposed about 7 mm. above the inlet. This measuring cell according to the invention has given excellent results for i.a. liquids with a viscosity and density substantially corresponding to that of water at room temperature and with a flow rate of 5 ml. per minute. Satisfactory measuring cells according to the invention have, however, also been designed for much larger flow rates, e.g., up to 50 or 60 ml. per minute.

I claim:
1. A method for separating gas bubbles from a liquid flow containing such gas bubbles, particularly with the object of measuring a physical characteristic of the liquid without any disturbance from said air bubbles, comprising the steps of passing the liquid flow containing said gas bubbles adjacent to but below a free liquid surface so that the gas bubbles in the liquid flow are caused to ascend towards said free liquid surface under the influence of their buoyancy in the liquid, passing the liquid flow thus free from said gas bubbles downwardly through a first closed conduit and then upwardly to an outlet, and passing simultaneously the gas disengaged from said free liquid surface from a closed space above the liquid surface, upwardly through a second closed conduit high enough to prevent siphoning therethrough, and then downwardly to said outlet, and reinserting the gas into the liquid flow at said outlet, said outlet including a conduit having a cross sectional area sufficiently small that it will be completely filled by a gas bubble after admixture with liquid.

2. A device for temporarily separating gas bubbles from a liquid flow containing such bubbles and subsequently reinserting the separated gas bubbles into the liquid flow, comprising an inlet and an outlet for said liquid flow, two branch conduits extending from said inlet to said outlet at different elevations over a substantial portion of their lengths, the upper branch conduit being closed from said inlet to said outlet and having a gas receiving portion located higher than both said inlet and said outlet, the lower branch conduit having a liquid receiving portion located lower than both said inlet and said outlet, measuring means located at a point along said lower branch conduit for measuring a physical characteristic of the liquid flowing through said lower branch conduit, the elevation of the highest point of said upper branch conduit above said inlet being greater than the elevation corresponding to the pressure drop in the liquid flow between said inlet and said outlet.

3. A device as claimed in claim 2 in which said outlet is higher than said inlet.

4. A device as claimed in claim 2 in which said lower branch conduit has a substantially vertical portion adjacent to said inlet.

5. A device as claimed in claim 2, wherein said upper branch conduit and said lower branch conduit are disposed in one and the same, substantially vertical plane and are substantially U-shaped with their legs directed downwards and upward respectively and connected to said inlet and said outlet.

6. A device as claimed in claim 2, wherein said inlet and said outlet are disposed on substantially the same level.

References Cited

UNITED STATES PATENTS

| 1,534,128 | 4/1925 | Marden | 73—200 |
| 1,559,115 | 10/1925 | Marker et al. | 55—174 |
| 2,449,067 | 9/1948 | Guillemin | 23—254 |
| 2,823,985 | 2/1958 | Strange | 23—232 |
| 2,884,366 | 4/1959 | Anderson et al. | 204—195 |
| 3,046,098 | 7/1962 | Brasseur et al. | 73—53 |

FOREIGN PATENTS 846,498   8/1960   Great Britain.

REUBEN FRIEDMAN, Primary Examiner.
C. N. HART, Assistant Examiner.